US008094525B2

(12) United States Patent
Ishimoto

(10) Patent No.: US 8,094,525 B2
(45) Date of Patent: Jan. 10, 2012

(54) INFORMATION RECORDING METHOD AND INFORMATION RECORDING APPARATUS

(75) Inventor: Tsutomu Ishimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 319 days.

(21) Appl. No.: 12/468,233

(22) Filed: May 19, 2009

(65) Prior Publication Data

US 2009/0290460 A1    Nov. 26, 2009

(30) Foreign Application Priority Data

May 20, 2008   (JP) ................................. 2008-132450

(51) Int. Cl.
*G11B 7/00*   (2006.01)

(52) U.S. Cl. ...................................... 369/30.2; 711/170

(58) Field of Classification Search ......................... None
See application file for complete search history.

(56) References Cited

U.S. PATENT DOCUMENTS

2009/0245049 A1* 10/2009 Toda ......................... 369/47.32

* cited by examiner

*Primary Examiner* — Wayne Young
*Assistant Examiner* — Brian Butcher
(74) *Attorney, Agent, or Firm* — Wolf, Greenfield & Sacks, P.C.

(57) ABSTRACT

In an information recording method, information is recorded to semiconductor memory when at least a specified amount of free space exists in the semiconductor memory. Information is recorded to magnetic memory when the free space in the semiconductor memory is insufficient but at least a specified amount of free space exists in the magnetic memory. Information is recorded to optical memory when the free space in both the semiconductor memory and the magnetic memory is insufficient. When retrieving recorded information, an access count is incremented, and information with a comparatively high access count is moved to the semiconductor memory, while information with a comparatively low access count is moved to the optical memory. Information is thus recorded to a recording medium suitably selected from among semiconductor memory, magnetic memory, and optical memory, thereby making effective use of each memory type.

7 Claims, 6 Drawing Sheets

INFORMATION RECORDING METHOD AND INFORMATION RECORDING APPARATUS

BACKGROUND OF THE INVENTION

1. Field of the Invention

The present invention relates to an information recording method and an information recording apparatus having semiconductor memory, magnetic memory, and optical memory.

2. Description of the Related Art

In the past, semiconductor memory, magnetic memory such as hard disks, and optical memory such as optical discs have been used as recording media for recording large amounts of information. The above memory types are not normally treated as a single storage unit, but instead are treated as respectively independent memory types.

In contrast, in recent years hybrid memory has been proposed, being a storage apparatus wherein a hard disk drive is equipped with flash or other semiconductor memory that acts as cache memory. By causing the semiconductor memory and the hard disk to operate jointly in such hybrid memory, it is possible to increase transfer rates beyond those of storage systems made up of hard disks alone. In hybrid memory, data with high access frequency is recorded to the semiconductor memory, while all other data is recorded to the hard disk.

In addition, a database system for recording medical imaging information has been proposed, wherein information with high usage frequency is stored in a relatively high-speed recording apparatus, while information with comparatively low usage frequency is recorded to a relatively low-speed recording apparatus. In this system, devices such as a CCD (charge-coupled device) or magnetic disk are used as the high-speed recording apparatus, while an optical disc apparatus is used as the low-speed recording apparatus. (See Japanese Unexamined Patent Application Publication No. H11-145916.)

SUMMARY OF THE INVENTION

However, in the hybrid memory described above, little consideration is given for joint operation that includes optical discs, with optical discs merely being used as independent, removable media. Furthermore, when data that is rarely ever accessed comes to occupy most of the hard disk, the user himor herself frees up space on the hard disk by moving data to optical discs or deleting. In addition, in the above database system, little consideration is given for joint operation that includes semiconductor memory.

Currently, in personal computers or other information recording apparatus intended for personal use, optical memory is primarily used for installing system programs or for viewing or listening to audio or video content. Meanwhile, when recording video or similar information onto a portable recording medium such as optical memory, for example, the user typically performs operations manually. In other words, the optical memory does not function as memory linked to the other memory types, and thus is not being utilized as part of a comprehensive memory system.

Being interchangeable, optical discs have the merit of being easily replaced by other optical discs when free space in the recording area is used up. Moreover, in the case of optical discs, the storage capacity for a single disc has been increased to 25 GB and 50 GB in recent years, with development proceeding on a next-generation optical disc with a capacity of approximately 100 GB. However, as described above, technology has not been proposed wherein optical memory is used in addition to semiconductor memory and magnetic memory as a means for actively storing information.

Being devised in light of the above problems, the present invention provides technology wherein information is recorded to a recording medium suitably selected from among semiconductor memory, magnetic memory, and optical memory, thereby making effective use of each memory type.

An information recording method in accordance with an embodiment of the present invention that solves the foregoing problems performs the following steps. At the time of recording information, the method records information to semiconductor memory in the case where the amount of free space in the recording area of the semiconductor memory equals or exceeds a predetermined range; the method records information to magnetic memory in the case where the amount of free space in the recording area of the semiconductor memory is less than the predetermined range, and wherein the amount of free space in the recording area of the magnetic memory equals or exceeds a predetermined range; and the method records information to optical memory in the case where the amount of free space in the recording areas of both the semiconductor memory and the magnetic memory is less than a predetermined range. At the time of retrieving recorded information, the method increments an access count, and then moves information with a comparatively high access count to the semiconductor memory, while moving information with a comparatively low access count to the optical memory.

In addition, an information recording apparatus in accordance with an embodiment of the present invention includes the following: semiconductor memory, to which information is preferentially recorded; magnetic memory, to which information is preferentially recorded in the case where the amount of free space in the recording area of the semiconductor memory is less than a predetermined range; optical memory, to which information is recorded in the case where the amount of free space in the recording areas of both the semiconductor memory and the magnetic memory is less than a predetermined range; and a controller. At the time of information retrieval, the controller increments an access count, while additionally conducting one or more of the following: comparing the access count to an access count threshold value set with respect to the semiconductor memory; and, comparing the access count to an access count threshold value set with respect to the magnetic memory. The controller then moves the information among the semiconductor memory, the magnetic memory, and the optical memory.

In an embodiment of the present invention, information is preferentially recorded to semiconductor memory in the case where the free space in the recording area thereof equals or exceeds a predetermined range, with information being recorded to magnetic memory in the case where the free space in the recording area of the semiconductor is less than a predetermined range. In the case where the free space in the recording area of the magnetic memory is less than a predetermined range, information is recorded to optical memory. In addition, an access count is set to a predetermined value at the time of information recording. At the time of information retrieval, a predetermined value is added to the access count, and the resulting access count after adding is then compared to access count threshold values set for the semiconductor memory and the magnetic memory. The information is then moved among the memory types.

Thus, in an embodiment of the present invention, semiconductor memory, magnetic memory, and optical memory are treated as a single storage system. Information is automatically recorded to a suitable memory type (i.e., a memory type determined by categorization according to access count), without the user manually deciding which memory type to record to each time. Consequently, information with low access frequency is first moved from semiconductor memory to magnetic memory, and then from magnetic memory to optical memory, according to the access frequency of the information. In contrast, information with high access frequency is moved from optical memory to magnetic memory, and then from magnetic memory to semiconductor memory. In so doing, effective use is made of all memory types.

Thus, according to an embodiment of the present invention, information is recorded to a recording medium suitably selected from among semiconductor memory, magnetic memory, and optical memory, thereby making effective use of each memory type.

DESCRIPTION OF THE PREFERRED EMBODIMENTS

Hereinafter, preferred embodiments for carrying out the present invention will be described by way of example, but the present invention is not to be limited to the following examples.

Figure 1:
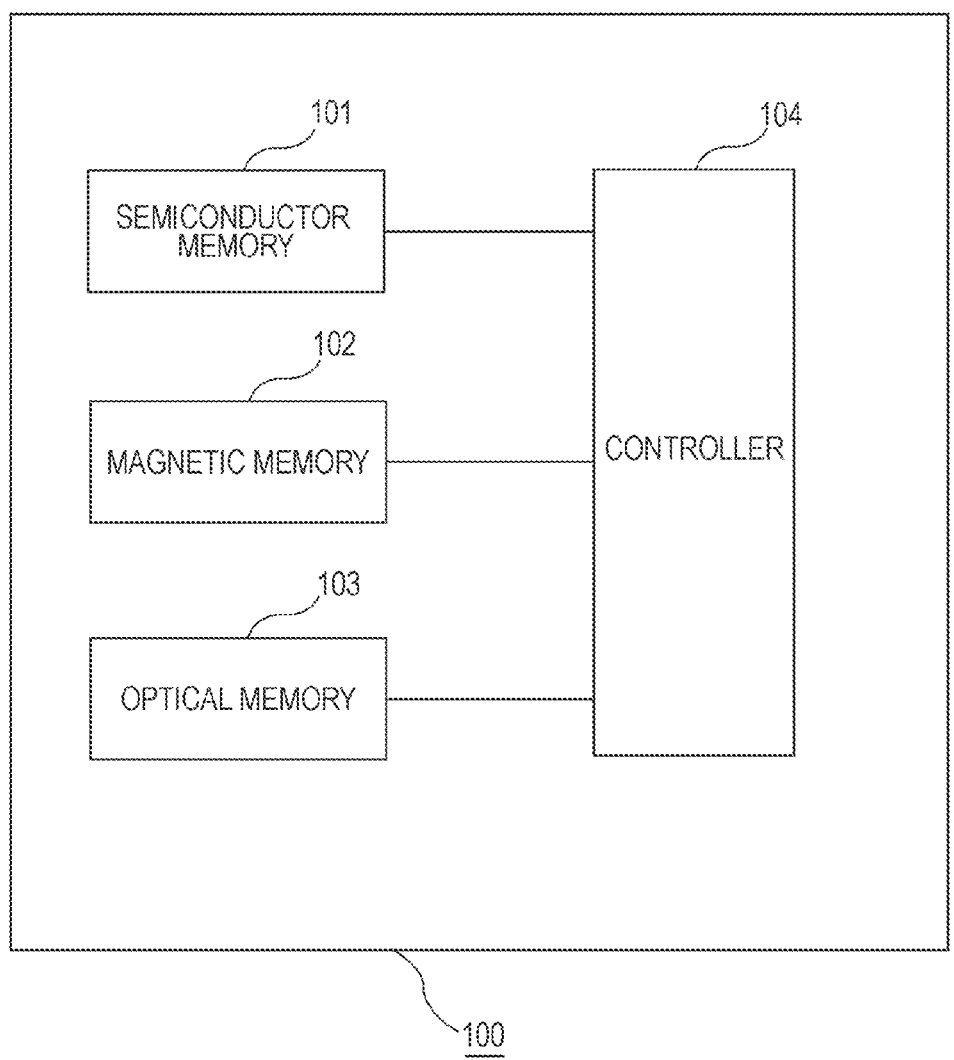
FIG. 1 is a diagram illustrating the general configuration of an information recording apparatus in accordance with an embodiment of the present invention.

The general configuration of an information recording apparatus in accordance with an embodiment of the present invention is shown in FIG. 1. As shown in FIG. 1, the information recording apparatus 100 in the present example includes semiconductor memory 101, magnetic memory 102 such as a hard disk, and optical memory 103 made up of high-capacity optical discs having recording capacities of 25 GB, 50 GB, or more, for example. Furthermore, the information recording apparatus 100 is also provided with a controller 104 (i.e., a CPU (central processing unit)) that controls the recording and retrieval of information with respect to the above memory types. Although not shown in FIG. 1, the information recording apparatus 100 may be additionally provided with components such as an input/output unit for inputting and outputting information with respect to the user, and a display unit that displays information.

An information recording method in accordance with an embodiment of the present invention that is executed by the information recording apparatus 100 will now be described with reference to FIGS. 2 to 6. First, the process executed at the time of recording information will be described with reference to FIG. 2.

Figure 2:
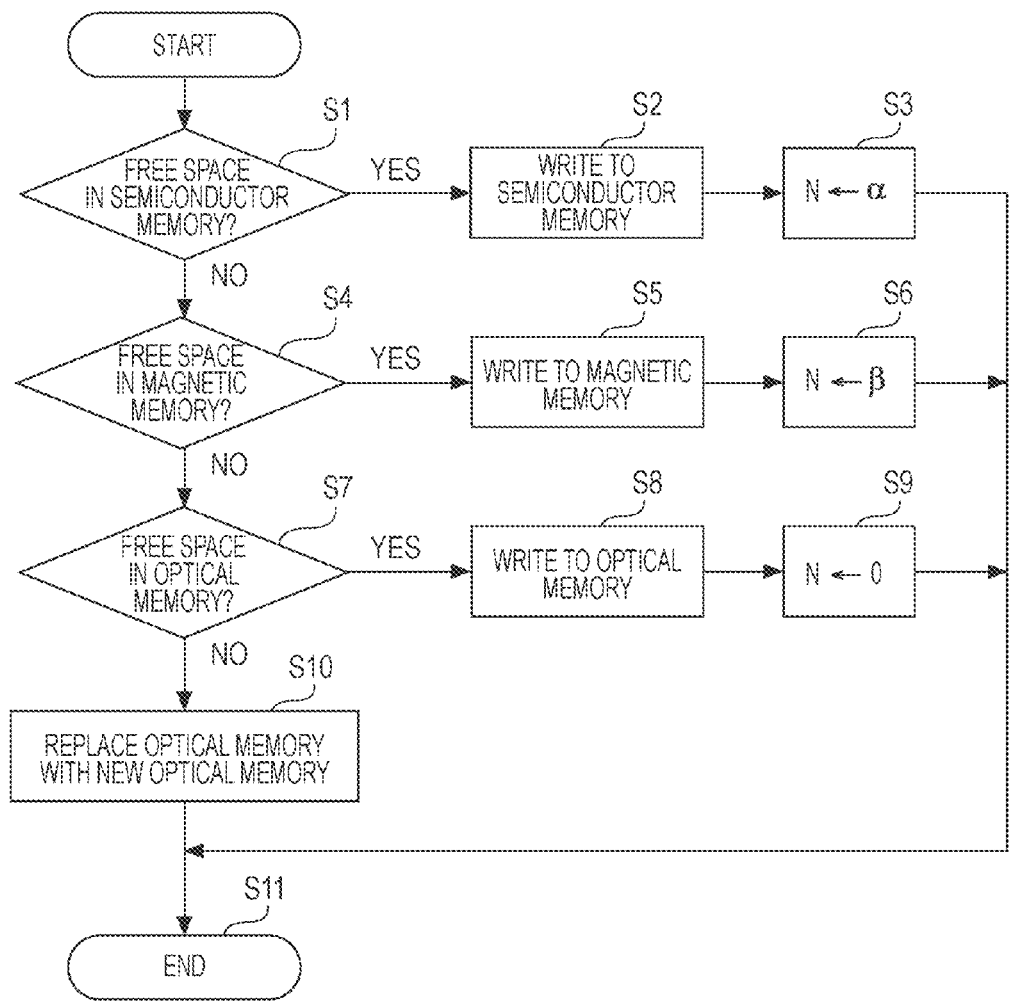
FIG. 2 illustrates a flowchart for an information recording method in accordance with an embodiment of the present invention.

As shown in FIG. 2, at the time of recording information, it is first determined whether or not the amount of free space in the recording area of the semiconductor memory 101 equals or exceeds a predetermined range (step S1). If the amount of free space in the recording area of the semiconductor memory 101 equals or exceeds the predetermined range, then information is written to the semiconductor memory 101 (step S2). Subsequently, an access count value N is set to a value α (where α is a natural number), for example (step S3). The process then proceeds to step S11.

If the amount of free space in the recording area of the semiconductor memory 101 is less than the predetermined range, then it is subsequently determined whether or not the amount of free space in the recording area of the magnetic memory 102 equals or exceeds a predetermined range (step S4). If the amount of free space in the recording area of the magnetic memory 102 equals or exceeds the predetermined range, then information is written to the magnetic memory 102 (step S5). In this case, the access count value N is set to a value β (where β is a natural number, and β<α), for example (step S6). The process then proceeds to step S11.

If the amount of free space in the recording area of the magnetic memory 102 is less than the predetermined range, then it is subsequently determined whether or not the amount of free space in the recording area of the optical memory 103 equals or exceeds a predetermined range (step S7). If the amount of free space in the recording area of the optical memory 103 equals or exceeds the predetermined range, then information is written to the optical memory 103 (step S8). In addition, the access count value N is set to a value γ (where γ is a natural number, and γ<β), for example (step S9). The process then proceeds to step S11. The value γ may also be 0 (zero). Herein, if the amount of free space in the recording area of the optical memory 103 is less than the predetermined range, then the optical memory 103 is replaced with new optical memory (step S10). Having executed the above steps, the information recording process is then terminated (step S11).

Herein, the predetermined range in the amount of free space in the recording area may be defined by setting an arbitrary threshold value. If an amount of free space corresponding to 0% is set as the predetermined range, then information will be frequently moved, which may lead to reduced information access speeds. Consequently, it is preferable to appropriately set the threshold value with due consideration for factors such as the storage capacity and access speed of each memory type. For example, the free space threshold value may be set between 5% and 10%, and in some cases may be set to approximately 20%.

By executing the above recording process, information is recorded to the semiconductor memory 101 as a first preference, with information being recorded to the magnetic memory 102 as a second preference in the case where the amount of free space in the recording area of the semiconductor memory 101 is less than the predetermined range. In addition, information is recorded to the optical memory 103 as a third preference in the case where the amount of free space in the recording area of the magnetic memory 102 is less than the predetermined range. Furthermore, if the amount of free space in the recording area of the optical memory 103 is less than the predetermined range, then the optical memory 103 (an optical disc, for example) is replaced, thereby enabling a new recording area to be acquired.

In addition, the predetermined values α, β, and γ are set as the access counts when initially recording. For example, information recorded to the semiconductor memory 101 or the magnetic memory 102 is preferably not moved immediately to the optical memory 103 at the time of the second access, and thus the above avoids wasteful move processing.

Figure 3:
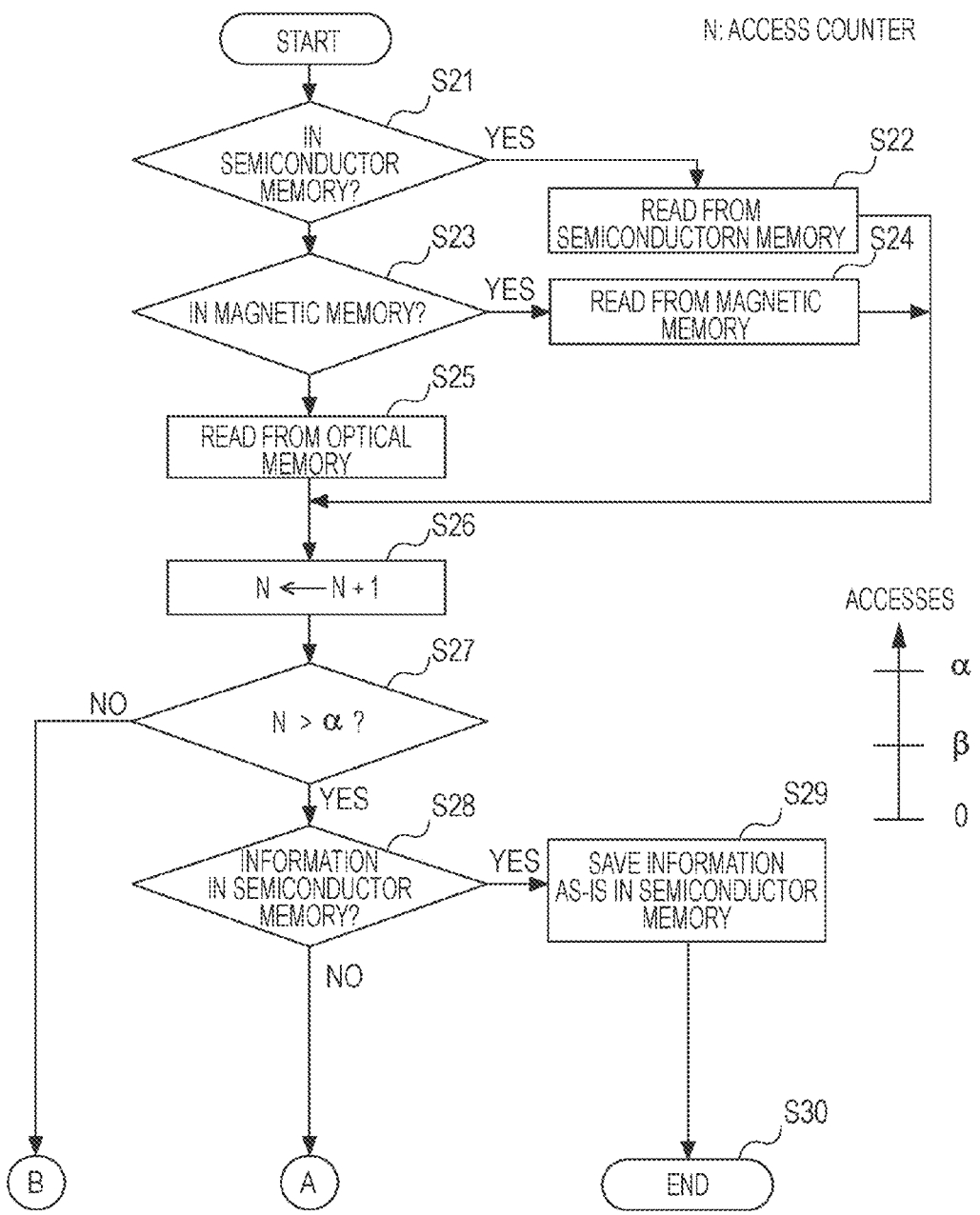
FIG. 3 illustrates a flowchart for an information recording method in accordance with an embodiment of the present invention.

Processing executed at the time of information retrieval will now be described with reference to FIGS. 3 to 6. As shown in FIG. 3, at the time of information retrieval, it is first determined whether or not the information is recorded in the semiconductor memory 101 (step S21). If the information is recorded in the semiconductor memory 101, then the information is read from the semiconductor memory 101 (step S22). The process subsequently proceeds to step S26.

If the information is not recorded in the semiconductor memory 101, then it is subsequently determined whether or not the information is recorded in the magnetic memory 102 (step S23). If the information is recorded in the magnetic memory 102, then the information is read from the magnetic memory 102 (step S24). The process subsequently proceeds to step S26.

In addition, if the information is not recorded in the magnetic memory 102, then the information is read from the optical memory 103 (step S25).

After reading the information, a predetermined value such as 1 is added to the access count value N (i.e., N=N+1) (step S26).

Subsequently, it is determined whether or not the access count value N is greater than $\alpha$ (i.e., N>$\alpha$) (step S27). If N is greater than $\alpha$, then it is determined whether or not the information is recorded in the semiconductor memory 101 (step S28). If the information is recorded in the semiconductor memory 101, then the information is saved as-is (step S29), and the process is terminated (step S30). In contrast, if the information is not recorded in the semiconductor memory 101, then the process (A) is initiated to save the information in the semiconductor memory 101. Meanwhile, if the determination in step S27 returns a NO (i.e., if the access count value N is less than or equal to $\alpha$ (N$\leq$$\alpha$)), then the process (B) later described is initiated.

Figure 4:
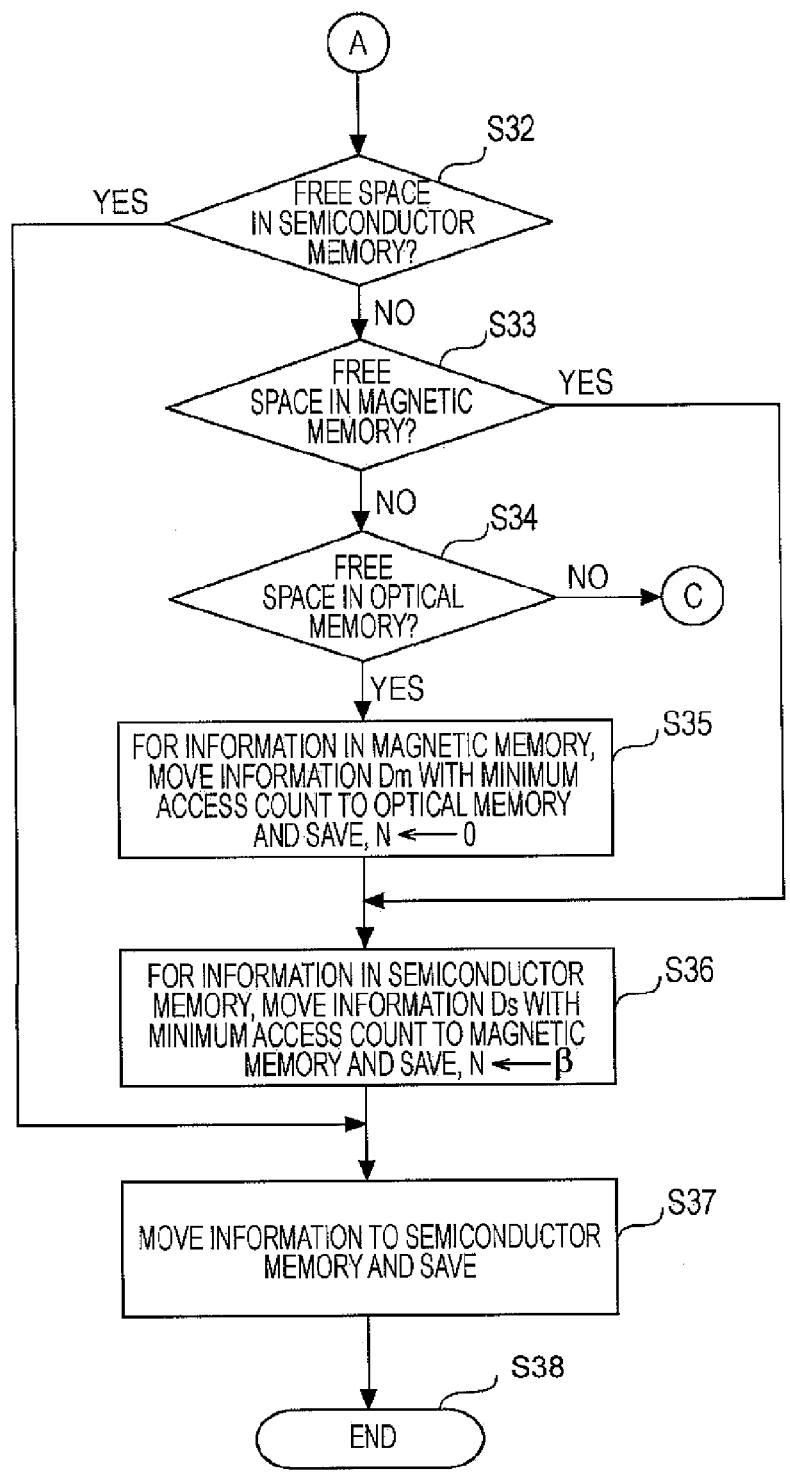
FIG. 4 illustrates a flowchart for an information recording method in accordance with an embodiment of the present invention.

As shown in FIG. 4, when moving information, it is first determined whether or not the amount of free space in the recording area of the semiconductor memory 101 equals or exceeds a predetermined range (step S32). If the amount of free space in the recording area of the semiconductor memory 101 equals or exceeds the predetermined range, then the process proceeds to step S37, to be hereinafter described. In contrast, if the amount of free space in the recording area of the semiconductor memory 101 is less than the predetermined range, then it is subsequently determined whether or not the amount of free space in the recording area of the magnetic memory 102 equals or exceeds a predetermined range (step S33). If the amount of free space in the recording area of the magnetic memory 102 equals or exceeds the predetermined range, then the process proceeds to step S36, to be hereinafter described. If the amount of free space in the recording area of the magnetic memory 102 is less than the predetermined range, then it is subsequently determined whether or not the amount of free space in the recording area of the optical memory 103 equals or exceeds a predetermined range (step S34).

Herein, the predetermined range in the amount of free space in the recording area may be defined by setting a threshold value similar to that of the predetermined range set at the time of recording information as described earlier.

In the above step S34, if the amount of free space in the recording area of the optical memory 103 is less than the predetermined range, then the process (C) later described is initiated. If the amount of free space in the recording area of the optical memory 103 equals or exceeds the predetermined range, then information Dm having the smallest access count from among the information in the magnetic memory 102 is first moved to the optical memory 103 and saved. Subsequently, the access count value N of the information Dm is reset to the above value $\gamma$ set with respect to the optical memory 103. For example, the access count value N of the information Dm may be reset to 0 (step S35).

Next, information Ds having the smallest access count from among the information in the semiconductor memory 101 is moved to and saved in the magnetic memory 102, wherein free space has been created as a result of the processing in the above step S35. Subsequently, the access count value N of the information Ds is reset to the above value $\beta$ set with respect to the magnetic memory 102 (step S36).

Subsequently, the information that was read is moved to the semiconductor memory 101 and saved (step S37). The read process for the first case, wherein the information access count N is greater than $\alpha$ (N>$\alpha$), is then terminated (step S38).

Figure 5:
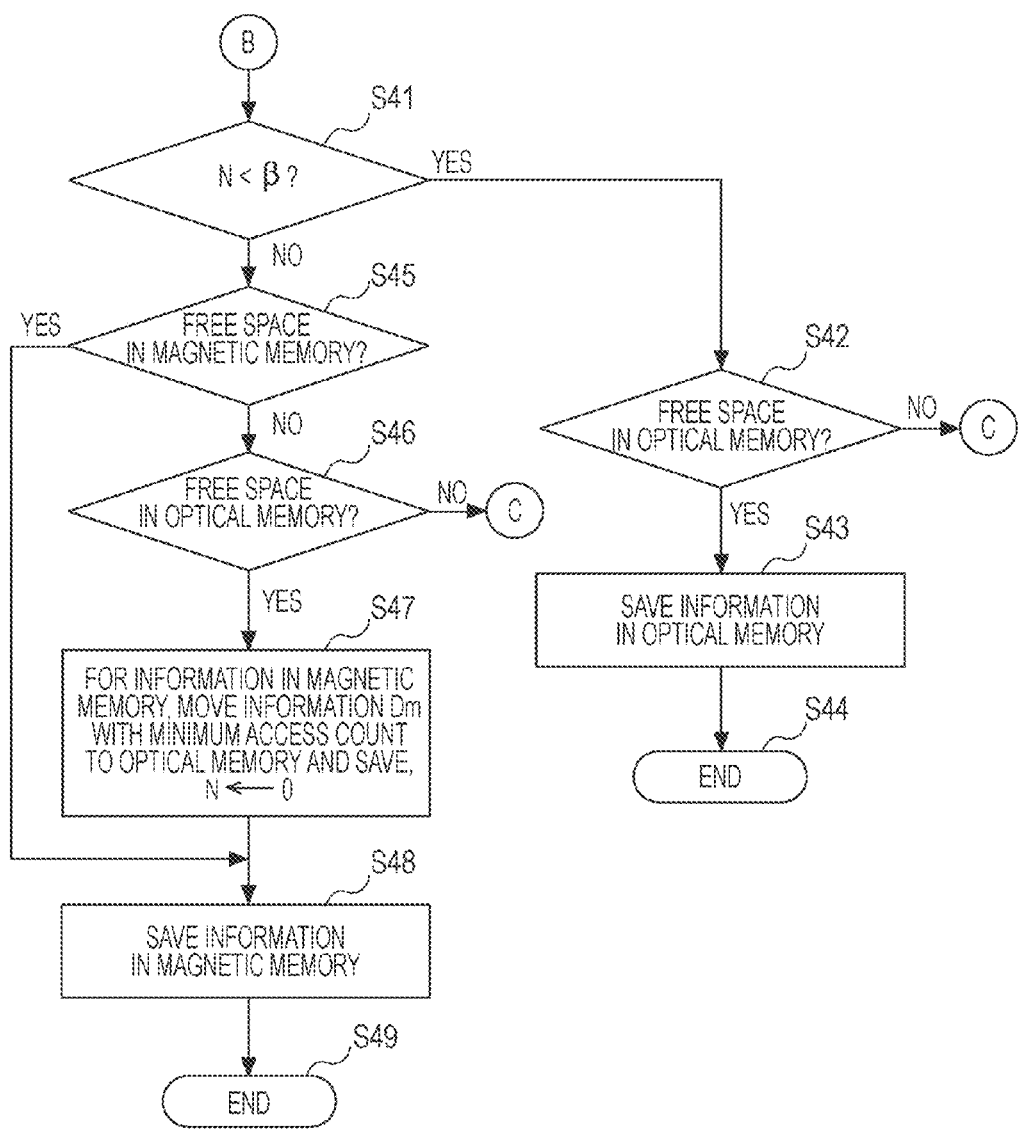
FIG. 5 illustrates a flowchart for an information recording method in accordance with an embodiment of the present invention.

Next, the case (B) will be described with reference to FIG. 5, wherein the information access count value N is determined to be less than or equal to $\alpha$ (N$\leq$$\alpha$) in step S27 shown in FIG. 3. In this case, it is first determined whether or not the count value N is less than $\beta$ (N<$\beta$) (step S41). If N is less than $\beta$ (N<$\beta$), then it is determined whether or not the amount of free space in the recording area of the optical memory 103 equals or exceeds a predetermined range (step S42). If the amount of free space in the recording area of the optical memory 103 is less than the predetermined range, then the process (C) later described is initiated. If the amount of free space in the recording area of the optical memory 103 equals or exceeds the predetermined range, then the information is saved in the optical memory 103 (step S43), and the process is terminated (step S44).

In contrast, if N is determined to be greater than or equal to $\beta$ (N$\geq$$\beta$) in step S41, then it is first determined whether or not the amount of free space in the recording area of the magnetic memory 102 equals or exceeds a predetermined range (step S45). If the amount of free space in the recording area of the magnetic memory 102 equals or exceeds the predetermined range, then the process proceeds to step S48 hereinafter described. If the amount of free space in the recording area of the magnetic memory 102 is less than the predetermined range, then it is subsequently determined whether or not the amount of free space in the recording area of the optical memory 103 equals or exceeds a predetermined range (step S46). If the amount of free space in the recording area of the optical memory 103 is less than the predetermined range, then the process (C) later described is initiated. If the amount of free space in the recording area of the optical memory 103 equals or exceeds the predetermined range, then information Dm having the smallest access count from among the information in the magnetic memory 102 is moved to the optical memory 103 and saved. Subsequently, the access count value N of the information Dm is reset to the above value $\gamma$ set with respect to the optical memory 103. For example, the access count value N of the information Dm may be reset to 0 (step S47). Subsequently, the information is saved in the magnetic memory 102 (step S48). The above read process for the case wherein the information access count N is between $\alpha$ and $\beta$ ($\alpha$$\geq$N$\geq$$\beta$) is then terminated (step S49).

Figure 6:
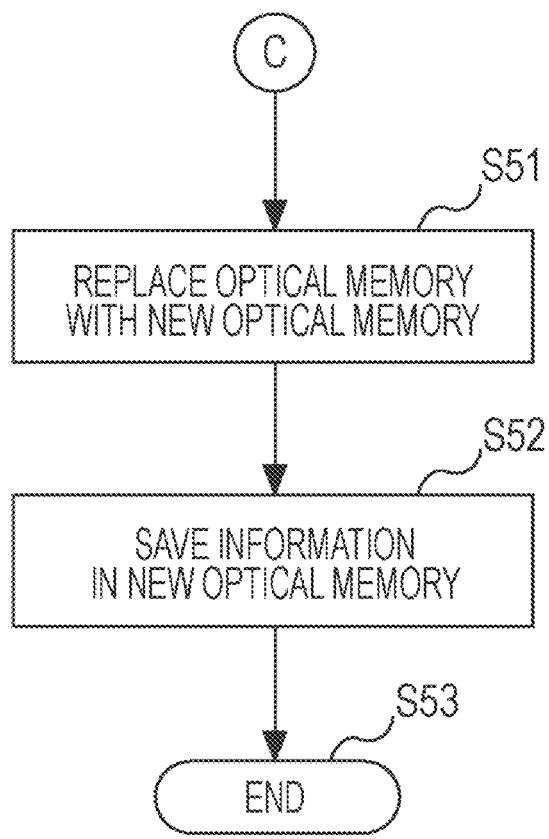
FIG. 6 illustrates a flowchart for an information recording method in accordance with an embodiment of the present invention.

Lastly, the case (C) will be described with reference to FIG. 6, wherein the amount of free space in the recording area of the optical memory 103 is determined to be less than a predetermined range in step S34 shown in FIG. 4, or in steps S42 or S46 shown in FIG. 5. In this case, the optical memory 103 is replaced with new optical memory (S51). Subsequently, the information is saved to the new optical memory (step S52), and the read process is then terminated (step S53).

As described above, the information recording method in the present example includes the following properties.

(1) Semiconductor memory 101, magnetic memory 102, and optical memory 103 are provided. At the time of initial recording, information is recorded to the semiconductor memory 101 as a first preference. If the amount of free space in the recording area of the semiconductor memory 101 is less than a predetermined range, then the information is recorded to the magnetic memory 102 (a hard disk, for example) as a second preference. If the amount of free space in the recording area of the magnetic memory 102 is less than a predetermined range, then the information is recorded to the optical memory 103 (an optical disc, for example) as a third preference.

(2) Usage of the above three memory types is differentiated according to information access frequency. Information with high access frequency is saved in semiconductor memory, information with medium access frequency is saved in magnetic memory, and information with low access frequency is saved in optical memory. These access frequencies are classified by setting threshold values.

(3) As information accumulates, information with low access frequency fills up the optical memory such that the amount of free space in the recording area of the optical memory becomes less than the predetermined range or 0. In this case, the optical memory (an optical disc, for example) is replaced with separate, new optical memory.

As described in (1) and (2) above, an information recording method in accordance with the present example automatically differentiates usage of the memory types according to access frequency. In addition, in cases including (3) above, the optical memory is treated as a semi-fixed storage system. By replacing the optical memory when filled to capacity, the capacity of the optical memory becomes, in principle, limitless.

As a result of the above, the information having the smallest access count is automatically moved to the optical memory, thereby freeing up a degree of space in the semiconductor memory and magnetic memory without involving conscious effort by the user. More specifically, when the recording area in the semiconductor memory becomes full, information having a small access count is automatically moved to the magnetic memory. Likewise, when the recording area in the magnetic memory becomes full, information having a small access count is automatically moved to the optical memory. If the recording area in the optical memory becomes full, then that optical memory is replaced by new optical memory, thereby enabling the continued accumulation of information.

In an information recording method and information recording apparatus in accordance with embodiments of the present invention as described above, the optical memory differs from optical discs or similar technology of the related art in that the optical memory is treated as semi-fixed memory, and is made to function in a manner equivalent to a hard disk with somewhat slow access speeds. The above differs from the usage of the related art wherein optical discs have been used as simple removable media, and thus the functionality thereof can be said to have been expanded.

In addition, as described earlier, access frequencies are distinguished by incrementing an access count each time information is read and by setting access count threshold values with respect to each memory type. The difference between the access count and a threshold value is then used to determine whether the number of accesses is large or small.

Furthermore, the information recording method and information recording apparatus of the present example may also be configured as follows.

(4) Operation may be suspended for memory not in use for information recording or retrieval. In other words, when information is being processed only in the semiconductor memory (i.e., when processing is confined to the semiconductor memory), then the operation of the magnetic memory and the optical memory may be suspended.

In this way, by suspending operation of memory types not being used for recording or retrieval, power consumption is reduced. In addition, the MTBF (Mean Time Between Failures) is extended for magnetic memory such as hard disks and optical memory such as optical discs.

In particular, the gap between the head and disk of a hard disk is an exceedingly small width of several nanometers. Moreover, if the system is assumed to use near-field optics to realize high-capacity optical discs, the gap is a very small width of several tens of nanometers. For this reason, when using a system that records and retrieves information by means of mechanical operations like those with respect to hard disks and optical discs, it is preferable to separate the head from the disk or disc when not in use, and enter a suspended state. In this way, by suspending the memory types not in use, undesired collisions between the head and the disk or disc can be avoided, and failures can thus be prevented.

In the foregoing embodiments, usage of semiconductor memory, magnetic memory, and optical memory is differentiated by focusing on access speeds. More specifically, semiconductor memory typically has the fastest access speeds, with magnetic memory such as hard disks and optical memory such as optical discs being slower, in that order. Consequently, it is advantageous to save information with high access frequencies in semiconductor memory, as doing so results in faster response times with respect to user requests.

In contrast, by recording information with low access frequencies in magnetic memory such as a hard disk rather than in semiconductor memory, space is freed up in the semiconductor memory having has fast access times. Similarly, by subsequently recording information with low access frequencies in optical memory rather than in magnetic memory, space is freed up in the magnetic memory having relatively fast access times. Information accessed by the user is thus first stored in semiconductor memory, effectively increasing transfer rates as a result.

Moreover, by conducting processes like the above, static information with the smallest access counts can be prevented from occupying most of the space in the semiconductor memory and the magnetic memory. Instead, such information is preferably recorded to optical memory, excellent for its relatively long-term reliability. Obviously, information no longer useful may also be deleted by the user. If such information causes the optical memory to become full, similar recording processing is made possible again by replacing the optical memory with new optical memory as described earlier.

It should be appreciated that the present invention is not limited to the configurations described in the foregoing embodiments. For example, the process for moving the information with smallest access count to another memory type is herein described as being conducted at the time of reading information. However, the above process may also be conducted at the time of recording rather than at the time of retrieval. Various alterations and modifications are thus possible without departing from the scope of the present invention.

The present application contains subject matter related to that disclosed in Japanese Priority Patent Application JP 2008-132450 filed in the Japan Patent Office on May 20, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information recording method, comprising steps of:
at a time of recording information:
recording information to semiconductor memory in a case where an amount of free space in a recording area of the semiconductor memory equals or exceeds a first predetermined range,
recording information to magnetic memory in a case where the amount of free space in the recording area of the semiconductor memory is less than the first predetermined range, and wherein an amount of free space in a recording area of the magnetic memory equals or exceeds a second predetermined range, and
recording information to optical memory in a case where the amounts of free space in the recording areas of both the semiconductor memory and the magnetic memory are less than a third predetermined range; and
at a time of retrieving recorded information:
incrementing an access count, and moving information with a comparatively high access count to the semiconductor memory, while moving information with a comparatively low access count to the optical memory.

2. The information recording method according to claim 1, further comprising steps of:
at the time of recording the information, setting an access count of the information to a first predetermined value; and
at the time of retrieving the recorded information:
adding a second predetermined value to the access count of the recorded information and retaining a result;
moving the recorded information from the magnetic memory to the semiconductor memory in a case where the recorded information is currently recorded in the magnetic memory, wherein the access count of the recorded information after the adding exceeds an access count threshold value set with respect to the semiconductor memory, and wherein the amount of free space in the recording area of the semiconductor memory equals or exceeds a fourth predetermined range; and
moving the recorded information from the optical memory to the magnetic memory in a case where the recorded information is currently recorded in the optical memory, wherein the access count of the recorded information after the adding exceeds an access count threshold value set with respect to the magnetic memory, and wherein the amount of free space in the recording area of the magnetic memory equals or exceeds a fifth predetermined range.

3. The information recording method according to claim 2, further comprising steps of:
at a time of moving information to the semiconductor memory, moving the information with a smallest access count among information in the semiconductor memory to the magnetic memory in a case where the amount of free space in the recording area of the semiconductor memory is less than a sixth predetermined range; and
at a time of moving information to the magnetic memory, moving information with a smallest access count among information in the magnetic memory to the optical memory in a case where the amount of free space in the recording area of the magnetic memory is less than a seventh predetermined range.

4. The information recording method according to claim 2, wherein the first predetermined value set as the access count at the time of recording is:
$\alpha$ in the case of the semiconductor memory (where $\alpha$ is a natural number),
$\beta$ in the case of the magnetic memory (where $\beta$ is a natural number, and $\beta<\alpha$), and
$\gamma$ or 0 in the case of the optical memory (where $\gamma$ is a natural number, and $\gamma<\beta$).

5. The information recording method according to claim 1, wherein the optical memory is replaced in a case where an amount of free space in a recording area of the optical memory becomes less than a fourth predetermined range.

6. The information recording method according to claim 1, wherein operation is suspended for memory types not currently being used to record or retrieve information.

7. An information processing apparatus, comprising:
semiconductor memory, to which information is preferentially recorded;
magnetic memory, to which information is preferentially recorded in a case where an amount of free space in a recording area of the semiconductor memory is less than a first predetermined range;
optical memory, to which information is recorded in a case where the amount of free space in the recording areas of both the semiconductor memory and the magnetic memory is less than a second predetermined range; and
a controller,
wherein at a time of information retrieval, the controller increments an access count, while additionally conducting one or both of the following:
comparing the access count to a first access count threshold value set with respect to the semiconductor memory, and
comparing the access count to a second access count threshold value set with respect to the magnetic memory, and
wherein the controller then moves information among the semiconductor memory, the magnetic memory, and the optical memory.

* * * * *